Patented June 29, 1926.

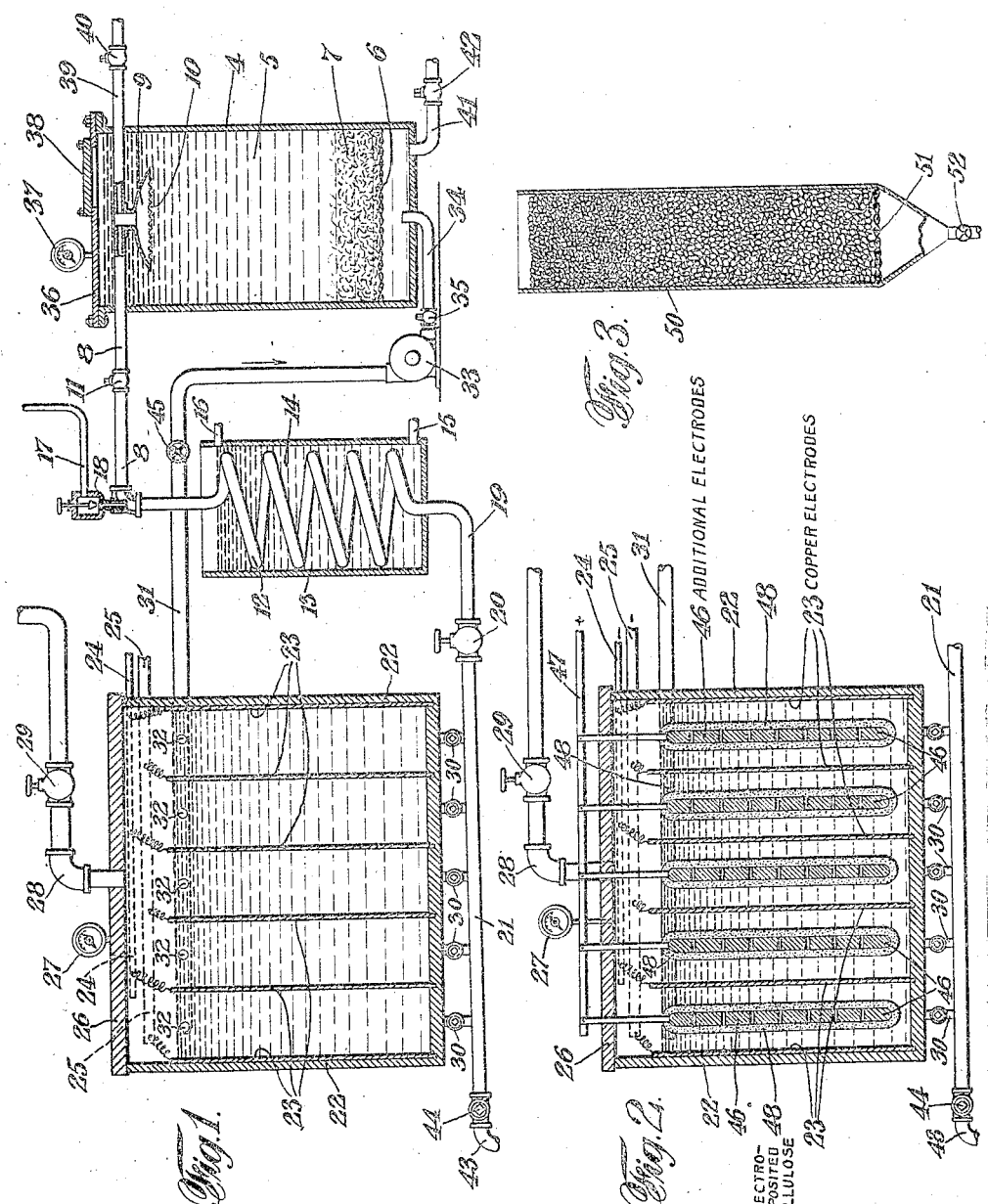

1,590,606

UNITED STATES PATENT OFFICE.

EDWIN TAYLOR, OF BROOKLYN, NEW YORK, ASSIGNOR TO TAYLOR LABORATORIES, INC., OF NEW YORK, N. Y., A CORPORATION OF NEW YORK.

METHOD OF TREATING ORGANIC MATERIAL AND APPARATUS THEREFOR.

Application filed June 21, 1924. Serial No. 721,380.

My invention relates to improvements in methods of treating organic material and apparatus therefor. The main object of the invention is to provide improvements whereby certain kinds of organic and other material may be conveniently and efficiently put into solution and the solvent constituents then removed therefrom, leaving the material in form convenient for further treatment or use. Further and more specific objects, features and advantages will more clearly appear from the detail description given below taken in connection with the accompanying sheet of drawings which form a part of this specification.

In the drawings, Fig. 1 is a vertical section, largely diagrammatic, illustrating an apparatus embodying the main features of my invention in one form. Fig. 2 is a similar view illustrating the electrolytic cell of Fig. 1 with additional electrodes therein. Fig. 3 is a vertical section illustrating one form of apparatus suitable for treating certain organic materials from the apparatus of Figs. 1 and 2 for certain purposes.

While my improvements may be usefully applied to various organic materials as well as other materials, I have found it particularly useful in connection with the treatment of cellulosic material and will, therefore, describe the invention in connection with the treatment of cellulosic material for the production of cellulose products.

Referring to Fig. 1, 4 represents a tank or chamber substantially filled with, in the present instance, the solvent solution of cellulose 5 such as a solution or cupro-ammonia in water. Other solutions, however, may be used depending upon the material being treated and even with cellulose other metal ammonia solutions may be used such as nickel ammonia solution. The chamber 4 is provided with a supporting screen 6 near its bottom adapted to permit the solution to pass therethrough and on this screen is placed the cellulosic or other material 7 to be dissolved. Leading from the top of the chamber 5 is a pipe 8 adapted to convey the solution from the chamber 5 through the inverted dish shaped member 9, the lower face of which is covered with a screen 10 to prevent undissolved pieces of cellulosic material from being carried into the pipe 8. Pipe 8 is provided with a valve at 11 and extends to a worm 12 in a chamber 13 filled with cooling water 14, the water being introduced at the bottom through pipe 15 and overflowing at the top through pipe 16. 17 represents a pipe connected with a supply of ammonia gas under pressure or liquid ammonia, which is injected into the solution passing through the pipe 8 by means of a valved injector 18. From the cooling worm 12 the solution passes through pipe 19 and through valve 20 to manifold pipe 21. 22 represents an electrolytic cell provided in the present instance with a series of copper electrodes 23, alternate electrodes 23 being electrically connected with bus bars 24 and 25 respectively. The cell 22 is sealed with a cover 26 and carries a pressure gage 27 for indicating the pressure within the cell. The cover is also provided with an exhaust pipe 28 having a valve at 29 through which ammonia and other gases may be withdrawn when desired. The solution in the manifold 21 passes into the spaces in the cell 22 between the electrodes 23 through valve connections 30. The solution is withdrawn from the top of the cell by means of the pipe 31 through connections 32. The solution is withdrawn through pipe 31 by means of a pump 33 and forced to return to the chamber 4 through pipe 34 provided with a valve at 35. The chamber 4 is sealed with a cover 36 also provided with a pressure gage 37 for indicating the pressure within the chamber 4 and the cover 36 is provided with an aperture through which the cellulosic or other material to be dissolved may be inserted, which aperture is normally sealed by cover 38. The inverted dish shaped member 9 is also connected with a pipe 39 provided with a valve 40 which I will for the present assume to be closed. The chamber 4 is also provided with another inlet pipe 41 provided with a valve at 42 which also I will for the present assume to be closed. The pipe 21 is also provided with a draw-off at 43 normally closed by a valve 44. The pipe 31 may also be provided with a valve 45 for closing the same.

According to the preferred manner of operation the chamber 4 and cell 22 are filled with water or ammonia water substantially as indicated, and the cooling water is also circulated through the tank 13. The pump 33 is started to circulate the water withdrawing same from chamber 4 through pipe 8, cooling coil 12 to pipes 19 and 21 and into the cell 22, whence it is withdrawn through pipe 31, pump 33 and forced through pipe 34 back through the chamber 5. The ammonia gas under pressure is introduced through the nozzle 18 and soon the water becomes more or less saturated with ammonia as it travels in its cyclic path back and forth between the chamber 4 and the cell 22. The bus bars 24 and 25 are connected to a source of alternating current thereby causing an alternating current to pass between the alternately arranged copper electrodes 23. This causes the copper from these copper electrodes to be kicked off therefrom electrolytically and dissolved in the ammonia solution thereby forming a cupro-ammonia solution. The cellulosic material 7 to be dissolved having been inserted in the chamber 5, and the cupro-ammonia solution being thus circulated therethrough will gradually dissolve more and more of the cellulosic material and the solution travelling in this cyclic path and through the electrolytic cell 22, will gradually have its strength of cupro-ammonia built up by the continual electrolytic removal of copper from the electrodes 23, which passes into the solution. The ammonia content of the solution may be built up as desired by regulating the valved nozzle 18. The cyclic operation is continued until the strength of the solution in cellulose has been built up to the desired point, or until this solution contains as much dissolved cellulose as is possible and still leave it not too thick for convenient handling. Then pump 33 is stopped and the valves 11, 18, 45 and 20 are closed and the cover 26 removed and an additional set of electrodes inserted as shown in Fig. 2. These additional electrodes are indicated in Fig. 2 at 46. They are inserted between the electrodes 23 and are electrolytically connected to a bus bar 47. The electrodes 46 may be made of antimony lead (say 40% lead and 60% antimony) and after inserting these electrodes the cover 26 is replaced and both of the bars 24 and 25 are connected to the negative terminal of a source of direct current while the bar 47 is connected to the positive terminal or pole thereof. Thereby a direct current is caused to pass between the electrodes 46 as anodes and the electrodes 23 as cathodes. This causes the cupro-ammonia solution of cellulose in the cell 22 to be acted upon electrolytically whereby cellulose is deposited upon the anodes 46 in layers as indicated at 48 while the copper of the solvent is caused to deposit electrolytically upon the copper cathodes 23 thereby replacing more or less of the copper thereon which was electrolytically taken therefrom in the first operation, and the ammonia is freed and such of it as is volatilized may be collected through pipe 28 and condensed for re-use. After substantially all the solvent constituents have been removed from the dissolved cellulose in the cell 22 and the cellulose has been substantially all deposited on the anodes 46, the cover 26 is removed and the anodes 46 removed and the cellulose stripped therefrom for further treatment and use.

While this operation of removing the solvent constituents electrolytically from the dissolved cellulose has been going on, the chamber 4 may be connected by means of pipes 41 and 39 to another cell and cooler like the cell 22 and cooler 13 for the purpose of building up another cell full of dissolved cellulosic material. When this is done the electrodes 46 after the cellulose has been stripped therefrom or other electrodes 46 may be inserted in the second cell in the same manner as above described and the cellulose deposited thereon and the solvent constituents removed in like manner and while this is going on a fresh batch of cellulose solution may be built up in the original cell 22 thereby forming an apparatus and arrangement whereby cellulose material is being substantially continuously dissolved and the solvent constituents removed therefrom and the cellulose deposited electrolytically. During these cyclic operations the electrodes 23 may suffer some additive loss of copper which however, may be replaced by adding finely divided copper to the tank 4 as occasion may require.

The condition of the cellulose deposited will depend more or less on the current density. If a low current density is used the cellulose will be deposited in a relatively tough flexible film. If, however, a high current density is used, the cellulose will be deposited thereon in a more or less porous, spongy or soft condition. I have found that by using a voltage of four volts and an amperage of 200 amperes in a cell employing 10 anode plates, each 16 inches by 10 inches, that a medium deposit is produced. The cellulose is deposited in a more or less white or transparent condition substantially free from impurities such as any dyes, etc. in the original cellulosic material introduced in the tank 4, these impurities being left in the solution. This is advantageous since it permits of the use as raw material of old rags and fabrics and various kinds, otherwise having little value.

The cellulose recovered from the electrodes 46 may be treated in any suitable way for the making of smokeless powder, photographic, films, imitation leather and other uses including the various ways mentioned in prior applications Ser. No. 341,953, filed Dec. 2, 1919, Ser. No. 364,980, filed Mar. 11, 1920.

If the cellulose is deposited in a somewhat soft or spongy condition, it may be stripped from the electrodes 46 and then broken up or relatively finely divided by pressing the same through a screen and then placing in a cylinder 50 as shown in Fig. 3 provided with a screen 51 at the bottom thereof for supporting the material in the cylinder. The material may then be washed by pouring water into the cylinder 50 until it completely surrounds the cellulose material therein and the water allowed to flow through the cylinder by opening the valve 52 at the bottom. In this way the material may be washed in running water to remove any ammonia left in the material. Then while the material is substantially surrounded with water, acetone or alcohol may be poured into the cylinder on top of the water and cellulose material, the acetone and alcohol being lighter than the water will remain on top, but will gradually descend as the water is permitted to flow out through valve 52. This valve is regulated so that the water passes out slowly and the acetone or alcohol follows down slowly and substantially completely replaces the water. These organic compounds such as alcohol and acetone act to very completely dehydrate the finely divided cellulose material and after the water is thus removed the addition of dehydrating agent is stopped and the dehydrating agent removed through the valve 52 as far as may be and the cellulose may be then dumped into a ball mill which is sealed (except for a pipe to carry away the volatilized acetone or the like) thereby causing the remaining dehydrating agent to be driven off. This leaves the cellulose in the form of a dry fine powder, suitable for face powder, surgical dressing powder, for nitrating, for filling for smokeless powder, or making celluloid, etc. or for making fresh cellulose solution.

While I have described my improvements in great detail and with respect to a preferred form thereof, I do not desire to be limited to such details or forms since many changes or modifications may be made and the invention embodied in widely different forms without departing from the spirit and scope of the improvements in their broader aspects; hence I desire to cover all modifications and forms coming within the language or scope of any one or more of the appended claims.

What I claim as new and desire to secure by Letters Patent is:

1. The method of treating organic material which consists in dissolving organic material in a solvent solution thereof in one chamber, conveying said solution to another chamber, increasing the strength of the solvent solution in the second chamber, returning the solution to the first chamber to dissolve more organic material therein, and continuing the cyclic transfer of the solution until the desired amount of organic material has been dissolved therein.

2. The method of treating organic material which consists in dissolving organic material in a metal compound solvent solution thereof in a chamber, removing the solution from said chamber, increasing the strength of the solvent solution by adding metal thereto electrolytically, returning the strengthened solution to the said chamber to dissolve more organic material therein, and continuing said cyclic transfer and building up of the solution until the desired amount of organic material has been dissolved therein.

3. The method of treating organic material which consists in dissolving organic material in a metal compound solvent solution thereof in a chamber, removing the solution from said chamber, increasing the strength of the solvent solution by adding metal thereto electrolytically, returning the strengthened solution to the said chamber to dissolve more organic material therein, and continuing said cyclic transfer and building up of the solution until the desired amount of organic material has been dissolved therein, and then removing solvent constituents from the dissolved organic material by electrolytic action.

4. The method of treating cellulosic material which consists in dissolving cellulosic material in a metal ammonia solvent thereof in a chamber, removing the solution from the chamber, and adding more of the metal thereto by electrolytic action, and returning the solution to the chamber to dissolve more cellulosic material.

5. The method of treating cellulosic material which consists in dissolving cellulosic material in a metal-ammonia solvent thereof, building up the solution by adding more of the metal thereto by electrolytic action and causing the solution to dissolve more cellulosic material.

6. The method of treating cellulosic material which consists in dissolving cellulosic material in a metal-ammonia solvent thereof, building up the solution by adding more of the metal thereto by electrolytic action and causing the solution to dissolve more cellulosic material, and finally removing solvent constituents from the dissolved cellulosic material by electrolytic action.

7. The method of dissolving cellulosic material which consists in dissolving some cellulosic material in a metal-ammonia solvent thereof, subjecting the solution to electrolytic action of an alternating current between electrodes of the metal, whereby metal is added to the solution electrolytically, and causing the solution to dissolve more cellulosic material.

8. The method which consists in subjecting a metal-ammonia solution to electrolytic action of an alternating current between electrodes of the metal whereby metal from the electrodes is added to the solution.

9. The method which consists in subjecting a metal-ammonia solution to electrolytic action of an alternating current between electrodes of the metal whereby metal from the electrodes is added to the solution, and adding ammonia to the solution under pressure.

10. The method which consists in dissolving organic material in a solvent solution thereof, building up the strength of the solution by electrolytic action and dissolving more organic material therein and continuing the cycle until the desired amount of organic material has been dissolved.

11. The method which consists in circulating a metal-ammonia solution through an electrolytic cell, dissolving cellulosic material therein while the solution is circulating and passing a current between electrodes of the cell during the circulation to increase the strength of the solution.

12. The method which consists in circulating a metal-ammonia solution through an electrolytic cell, dissolving cellulosic material therein while the solution is circulating and passing an alternating current between electrodes of the metal in the cell during the circulation to increase the strength of the solution and dissolve more cellulosic material therein.

13. The method which consists in circulating a metal-ammonia solution through an electrolytic cell, dissolving cellulosic material in the solution while the solution is circulating and passing an alternating current between electrodes of the metal in the cell during the circulation to increase the strength of the solution and dissolve more cellulosic material in the solution connecting said electrodes to the negative pole of a source of direct current, causing said electrodes to act as cathodes, inserting cooperating anodes in the cell between said cathodes and subjecting the solution to direct current electrolysis to remove solvent constituents from the solution of cellulosic material and deposit cellulose on the anodes.

14. The method which consists in circulating a metal-ammonia solution through an electrolytic cell, dissolving cellulosic material in the solution while the solution is circulating and passing a current between electrodes of the cell during the circulation to increase the strength of the solution, and adding ammonia to the solution during the circulation.

15. The method which consists in circulating a metal-ammonia solution through an electrolytic cell, dissolving cellulosic material in the solution while the solution is circulating and passing a current between electrodes of the cell during the circulation to increase the strength of the solution, and adding ammonia to the solution during the circulation, and cooling the solution during the circulation.

16. The method which consists in circulating a metal-ammonia solution through an electrolytic cell, dissolving cellulosic material in the solution while the solution is circulating and passing an alternating current between electrodes of the metal in the cell during the circulation to increase the strength of the solution and dissolve more cellulosic material in the solution, adding ammonia to the solution and cooling the solution during the circulation.

17. The method which consists in circulating a metal-ammonia solution through an electrolytic cell, dissolving cellulosic material in the solution while the solution is circulating and passing an alternating current between electrodes of the metal in the cell during the circulation to increase the strength of the solution and dissolve more cellulosic material in the solution, and then passing a direct current between electrodes in the solution in the cell to remove solvent constituents from the dissolved cellulose and deposit cellulose.

18. The method of treating cellulosic material which consists in forming a solution thereof in a metal-ammonia solution, subjecting the solution to electroyltic action to remove solvent constituents from the dissolved cellulose, displacing the water from the resultant cellulose with a volatile organic dehydrating agent, and volatilizing the dehydrating agent from the cellulose.

19. The method which consists in dissolving cellulosic material in a metal-ammonia solvent thereof, subjecting the solution to electrolytic action to remove solvent constituents from the dissolved cellulose, the electrolytic current density being such as to deposit the cellulose in spongy soft condition, removing the cellulose and breaking it up and displacing the water from the resultant cellulose with a volatile organic dehydrating agent, and volatilizing the dehydrating agent from the cellulose.

20. The method which consists in dissolving cellulosic material, removing solvent constituents therefrom, breaking up the resultant cellulose and displacing the water from the resultant cellulose with a volatile organic dehydrating agent, and volatilizing the dehydrating agent from the cellulose.

21. In an apparatus of the class described the combination of an electrolytic cell, a chamber for dissolving organic material therein, means for transferring the solution of organic material from the chamber to the cell, said cell having metal electrodes energized by alternating current whereby an alternating current is caused to pass between the electrodes and cause metal therefrom to enter the solution in the cell, and means for conveying the solution back to the container to dissolve more organic material.

22. In an apparatus of the class described the combination of an electrolytic cell, a chamber for dissolving organic material therein, means for transferring the solution of organic material from the chamber to the cell, said cell having metal electrodes energized by alternating current whereby an alternating current is caused to pass between the electrodes and cause metal therefrom to enter the solution in the cell, means for conveying the solution back to the container to dissolve more organic material, and means for cooling the solution on its way between the chamber and the cell.

23. In an apparatus of the class described the combination of an electrolytic cell, a chamber for dissolving organic material therein, means for transferring the solution of organic material from the chamber to the cell, said cell having metal electrodes energized by alternating current whereby an alternating current is caused to pass between the electrodes and cause metal therefrom to enter the solution in the cell, means for conveying the solution back to the container to dissolve more organic material, means for cooling the solution on its way between the chamber and the cell, and means for adding reagent to the solution on its way between the chamber and the cell.

24. In an apparatus of the class described the combination of an electrolytic cell, a chamber for dissolving organic material therein, means for transferring the solution of organic material from the chamber to the cell, said cell having metal electrodes energized by alternating current whereby an alternating current is caused to pass between the electrodes and cause metal therefrom to enter the solution in the cell, means for conveying the solution back to the container to dissolve more organic material, and electrodes adapted to be inserted between said first mentioned electrodes in the cell and upon passing a direct current between said first mentioned electrodes and said last mentioned electrodes, to have material from said solution electro-deposited thereon.

In testimony whereof I have signed my name to this specification.

EDWIN TAYLOR.